Young & Hoard,
Wood Screw.

Nº 66,931. Patented July 16, 1867.

Witnesses.
M. Bailey
Chas. G. Page Jr.

Inventors
Young & Hoard
by

United States Patent Office.

SOLOMON W. YOUNG AND JOHN W. HOARD, OF PROVIDENCE, RHODE ISLAND.

Letters Patent No. 66,931, dated July 16, 1867.

IMPROVED TOOL FOR THREADING SCREWS.

*The Schedule referred to in these Letters Patent and making part of the same.*

TO WHOM IT MAY CONCERN:

Be it known that we, SOLOMON W. YOUNG and JOHN W. HOARD, of Providence, in the county of Providence, and State of Rhode Island, have invented certain new and useful improvements in Tools for Threading Screws; and we hereby declare the following to be a full, clear, and exact description of the same, reference being had to the accompanying drawings, in which—

Figure 3:
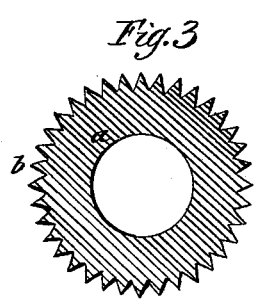

Figure 3 a transverse section of the same.

Figure 4:
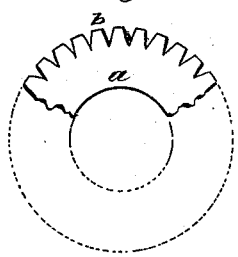

Figure 4 is an end elevation of a modified form of the cutter.

Figure 5:
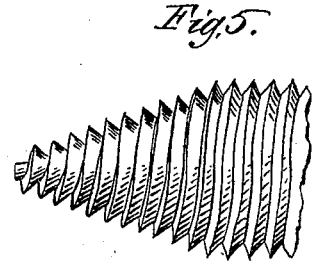

Figure 5 represents the form of the thread cut by the tool, and the position it occupies with relation to the main body of the screw.

Our invention relates to cutters or tools used in lathes, or in connection with other suitable mechanism, to form the thread upon screw-blanks, and it consists essentially of a cutting tool, of cylindrical or other suitable curvilinear form, carrying a series of blades or projections running lengthwise of the tool, and terminating at either or both ends of the same in cutting points which project from the said tool in the manner hereinafter explained.

The advantages which arise from the employment of the cutter are numerous. The most important are, first, the work is done more expeditiously than when the ordinary tools are employed; second, the arrangement of the cutting points upon a circle or segment of the same, causes the tool to cut the thread at a uniform angle with the blank, no matter at what inclination the latter is presented to it, or whether the thread is being cut upon the body or shank, or upon the bevelled or tapering end, the thread will be at the same relative angle, both to the main shank and to the taper or conical end. This is done without varying or altering the position of the tool in the holder or chuck, and gives a better and neater finish to the whole screw, and especially to the point. With regard to the rapidity of work, the tool we use gives three or more cuts at once, and thus accomplishes, in the same space of time, more than twice as much as the ordinary cutting tool. The depth of the cuts is graduated, the foremost point slightly cutting the blank, the second cutting deeper, and so on, each point following in the path of the other, as the blank is fed along, and completing the thread with great rapidity and precision.

To enable those skilled in the art to understand and use our invention, we will now proceed to describe it by reference to the accompanying drawings.

Figure 1:
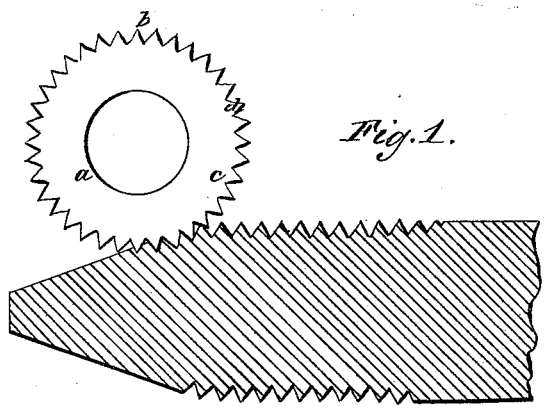
Figure 1 represents in elevation the tool in the act of cutting the thread upon a blank.
Figure 2:
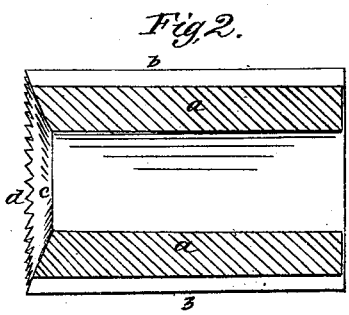
Figure 2 is a longitudinal central section of the tool.

In figs. 2 and 3 are represented a longitudinal and a transverse section of a tool which has a cylindrical form. It is, however, needless to say that the same may be simply a section or segment of a cylinder, as shown in transverse section in fig. 4, or it may have any other suitable curvilinear form. While therefore we illustrate the principle of our invention by means of a cylindrical cutter, it will be understood that the peculiar arrangement of the blades and cutting points will be followed in any modified form of the tool.

Upon the surface of the cylinder $a$, shown in the figures above mentioned, a series of longitudinal blades or projections, $b$, is formed, each one being parallel or thereabouts with the axis of the cylinder. The distance between these blades, as well as their shape, will of course vary to suit the size and conformation of thread desired. These blades extend from one end of the cylinder to the other, and in order to form cutting points one of the ends of the cylinder is recessed, and the sides of the recess are bevelled, as shown at C. By thus bevelling the sides of the recess the ends of the blades $b$ are cut away so as to form a series of cutting points, $d$, upon the periphery, and projecting out from the end of the cylinder. The tool thus constructed may be used in the place of the ordinary cutting tool employed for like purposes. It can be readily sharpened, when the teeth or points $d$ become worn or broken, by increasing the depth of the recess, and bevelling the sides of the same so as to bring the ends of the blades again to a point. The tool may be placed in a holder or mounted firmly and immovably upon a stem or handle, which in turn may be held in place in any suitable manner.

The operation of a cutter upon a screw-blank is fully illustrated in fig. 4. It will be seen that, as above mentioned, there are three or four cuts given at once, which causes the work to be completed with great rapidity. As the blank is fed along, the three or four points which are in contact with it enter it, the foremost one slightly, and the succeeding ones deepen the cut until the thread is of the required dimensions. If at any time the points on one part of the circular edge become worn or damaged the tool can be turned so as to bring another portion of the edge in contact with the blank.

Having now described our invention and the manner in which the same is or may be carried into effect, what we claim and desire to secure by Letters Patent, is—

A longitudinally ribbed cutting tool, of cylindrical or other suitable form, the end of which is bevelled or recessed so as to form the extremities of the said longitudinal ribs or blades into cutting points, in the manner herein shown and specified.

In testimony whereof we have signed our names to this specification before two subscribing witnesses.

SOLOMON W. YOUNG,
JOHN W. HOARD.

Witnesses:
CHARLES SELDEN,
HENRY MARTIN.